Sept. 6, 1966     H. W. LEADBEATER     3,270,578
MOTION CONTROL SHEAVE
Filed June 1, 1964     2 Sheets-Sheet 1
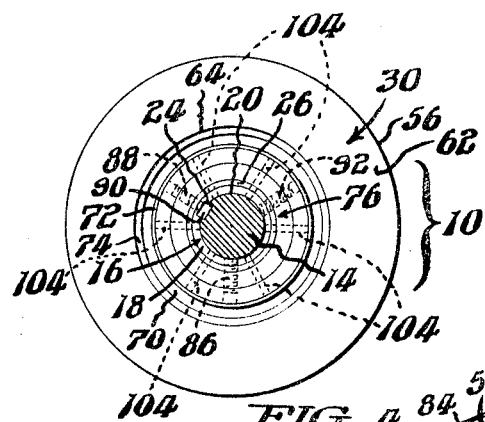
FIG. 2
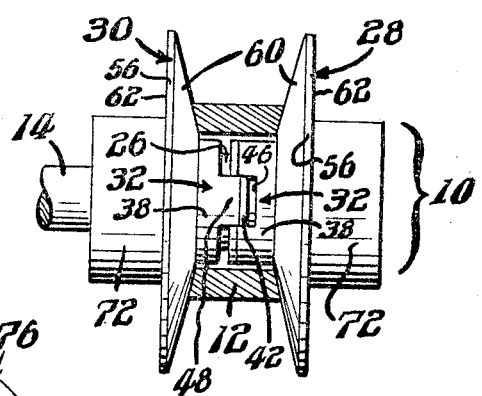
FIG. 1
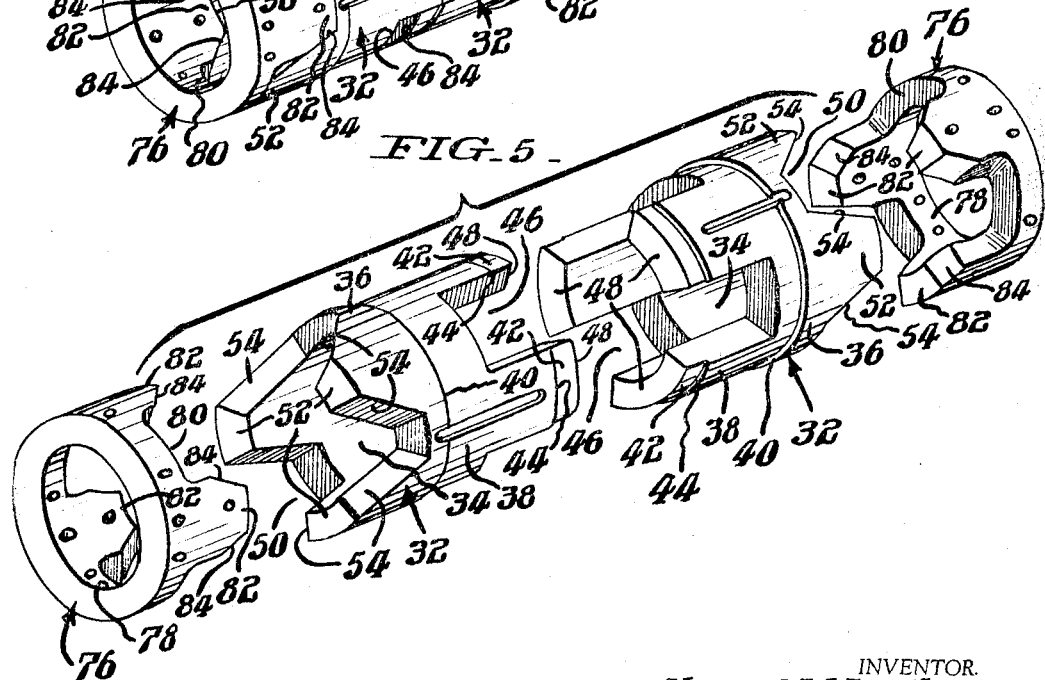
FIG. 4
FIG. 5
INVENTOR.
*Howard W. Leadbeater,*
BY
*Paul & Paul*
ATTORNEYS.

Sept. 6, 1966 H. W. LEADBEATER 3,270,578
MOTION CONTROL SHEAVE
Filed June 1, 1964 2 Sheets-Sheet 2
FIG_3_
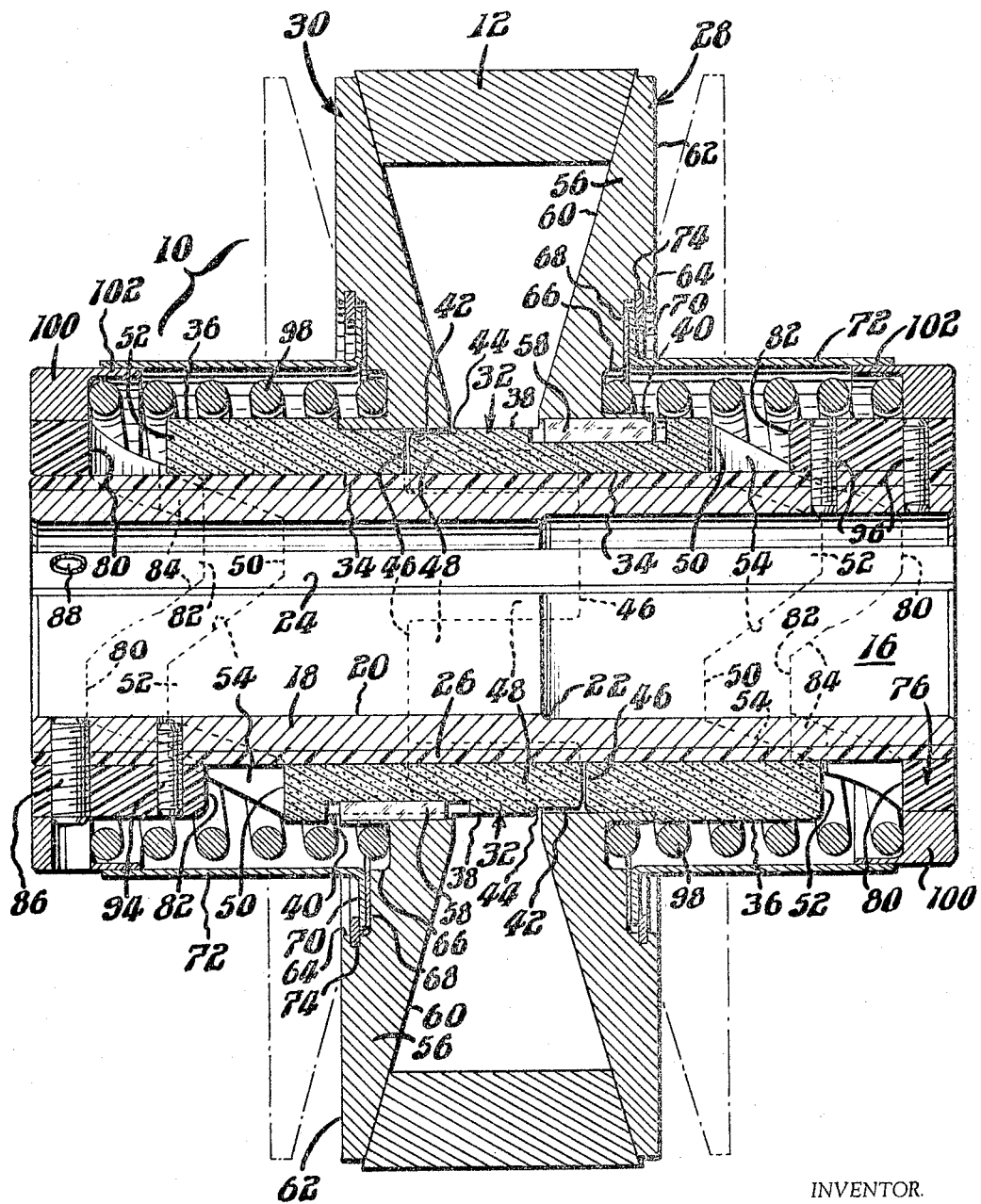
INVENTOR.
Howard W. Leadbeater,
BY
Paul & Paul
ATTORNEYS.

United States Patent Office 3,270,578
Patented Sept. 6, 1966

3,270,578
MOTION CONTROL SHEAVE
Howard W. Leadbeater, Glenside, Pa., assignor to Universal American Corporation, New York, N.Y., a corporation of Delaware
Filed June 1, 1964, Ser. No. 371,663
4 Claims. (Cl. 74—230.17)

This invention relates generally to motion control sheaves and particularly to improvements in motion control sheaves of the type in which the flanges are movable relative to each other to effect changes in pitch.

An important object of the invention is to provide an improved motion control sheave of the type in which the flanges are movable axially relative to each other to effect changes in pitch while the sheave is rotating.

Another object is to provide such a sheave which does not require periodic lubrication.

Another object is to provide such a sheave wherein relatively movable parts which might otherwise freeze or bind are made respectively of plastic polymer and oil impregnated material to eliminate the need for periodic lubrication.

Other objects will become apparent when the following description is read with reference to the accompanying drawings, in which:

FIG. 1 is a view of a motion control sheave constructed in accordance with the invention, the sheave being mounted upon the end of a motor shaft and the flanges thereof being held in minimum pitch relationship by a drive belt;

FIG. 2 is a view looking at one side of the sheave shown in FIG. 1, the drive belt being omitted;

FIG. 3 is an enlarged longitudinal section through the sheave shown in FIG. 1, the maximum pitch position of the flanges being shown by full lines and the minimum pitch position of the flanges being shown by broken lines;

FIG. 4 is a perspective view of a set of cam members, shown alone and assembled; and FIG. 5 is an exploded perspective view of the cam members shown in FIG. 4.

The following description is directed to the specific embodiment of the invention illustrated in the drawings and is not intended to be addressed to the scope of the invention, which may be practiced in a variety of forms.

Referring to FIG. 1, a motion control sheave 10 constructed in accordance with the invention is driven by the output shaft 14 of a motor (not shown). In turn, the sheave 10 drives the belt 12.

The sheave 10 is provided with a hub, generally designated 16, including a metallic inner sleeve 18 having a through bore 20 larger at one of its ends than at the other to form a circumferentially extending shoulder 22. Extending through the sleeve 18 is a keyway 24. Shrunk onto the inner sleeve 18 is an outer sleeve 26 made of a suitable polymer material, for example, nylon.

Mounted upon the outer sleeve 26 are a pair of sub-assemblies 28 and 30. A description of the sub-assembly 28 will suffice also for a description of the sub-assembly 30. The sub-assembly 28 includes a cylindrical dog clutch cam member 32 made of oil impregnated sintered metal, for example, bronze. Cam member 32 has a longitudinally extending through bore 34. The outer end portion 36 of cam member 32 is of major outside diameter. The intermediate portion 38 of cam member 32 is of reduced diameter in order to form a circumferentially extending shoulder 40. The inner end portion 42 of cam member 32 is of minor diameter in order to form a circumferentially extending shoulder 44. The inner end of cam member 32 is provided with recesses 46 in order to form circumferentially equally spaced longitudinally extending tongues 48, while the outer end of cam member 32 is provided with recesses 50 in order to form circumferentially equally spaced longitudinally extending tongues 52, each of which tongues 52 has opposite side angularly related cam surfaces 54.

Fitted over the intermediate portion 38 of cam member 32 is a flange 56 secured to cam member 32 by means of a parallel key 58. The inner face of the flange 56 is conically shaped, as at 60, while the outer face is flat, as at 62. Formed in the outer face 62 is a large diameter annular depression 64 and a reduced diameter annular depression 66.

Fitted into the annular depression 64 is a gasket 68. Abutting the gasket 68 is the flange 70 of an axially extending cylindrical sleeve 72 which is secured in position by means of a snap ring 74.

The sub-assemblies 28 and 30 are angularly offset relative to each other so that the tongues 48 of each dog clutch cam member 32 are received by the recesses 46 of the other dog clutch cam member 32 and the conically shaped faces 60 of the flanges 56 face each other to form a V-shaped groove for receiving the V-belt 12.

Fitted over the opposite end portions of the hub 16 respectively are a pair of cylindrical cam members 76 made of a suitable polymer material, for example, nylon. Each cam member has a longitudinally extending through bore 78. The inner end portion of cam member 76 is provided with recesses 80 in order to form circumferentially equally spaced longitudinally extending tongues 82, each of which tongues 82 has opposite side angularly related cam surfaces 84. Each cam member 76 is oriented so that its tongues 82 project into the recesses 50 of the opposed cam member 32. A set screw 86 is threaded through the cam member 76, the outer sleeve 26 of the hub 16 and the inner sleeve 18 of the hub 16, the inner end thereof bearing directly upon the shaft 14. A set screw 88 in the same transversely extending plane as the set screw 86 and angularly offset 120 degrees from the set screw 86 is threaded through the cam member 76, the outer sleeve 26 of the hub 16 and the inner sleeve 18 of the hub 16, its inner end engaging a parallel key 90 seated in the keyway 24, which key 90 secures the sheave to the shaft. A set screw 92 in the same transversely extending plane as the set screws 86 and 88 and angularly offset therefrom by 120 degrees is threaded through the cam member 76 and outer sleeve 26 of the hub 16 and into the inner sleeve 18 of the hub 16. Threaded through each of the tongues 82 and outer sleeve 26 of the hub 16 and into the inner sleeve 18 of the hub 16 is a set screw 94. At the opposite end of the hub 16, the cam member 76 is secured by means of set screws 96, there being a pair of set screws 96 threaded through each tongue 82 and outer sleeve 26 of the hub 16 and into the inner sleeve 18 of the hub 16.

At each end of the hub 16 a compression spring 98 is fitted over the cam members 76 and 32. The inner end of the spring is received by the depression 66 of the flange 56. Fitted over the cam member 76 is an end ring 100 provided with an axially extending flange 102 telescoped into the outer end of the sleeve 72 and secured in position by means of a set of six circumferentially equally spaced spring pins 104.

In assembling the sheave the sub-assemblies 28 and 30 are partially made up by fitting the flanges 56 respectively over the dog clutch cam members 32 and securing the same against angular movement by means of parallel keys 58. Then these partial assemblies are fitted over the hub 16 and oriented so that the conically shaped surfaces 60 thereof face each other to form a V-shaped groove for receiving the V-belt 12 and so that the tongues 48 of each dog clutch cam member 32 are projected into the recesses 46 of the other dog clutch cam member 32.

Thereupon cam members 76 are fitted respectively over the opposite end portions of the hub 16 and secured in position by means of set screws 92, 94 and 96. Then the hub 16 is secured against axial shifting movement by means of set screw 86, which bears directly upon shaft 10 and by means of set screw 88 which bears on the key 90.

Now, on each side of the sheave, the compression spring 98 may be fitted over the associated cam member 76 and dog clutch cam member 32. The inner end of the spring seats against the bottom of the depression 66. After positioning the gasket 68 against the bottom of the depression 64 and the flange 70 of the sleeve 72 against the gasket 68, the gasket 68 and sleeve 72 are secured in position by means of the snap ring 74.

Now the end rings 100 are fitted respectively over the cam members 76, and the flange 102 of each end ring is telescoped into the outer end of the associated sleeve 72. The end rings are now secured in position by the set of spring pins 104.

In FIG. 3, the position of the flanges 56 shown in full lines illustrates the high speed maximum pitch position thereof. The motor shaft 14 turns the hub 16 and cam members 76. The cam members 76 and dog clutch cam members 32 are interlocked by reason of the tongues 82 of each cam member 76 being partially projected into the recesses 50 of the adjacent dog clutch cam member 32. Torque is transmitted to the dog clutch cam members 32 through engaging cam surfaces 84 of tongues 82 and 54 of tongues 52. Thus the sub-assemblies 28 and 30 are turned. The sub-assemblies are fully interlocked by reason of the tongues 48 of each dog clutch cam member 32 being fully projected into the recesses 46 of the other dog clutch cam member 32. Thus the sub-assemblies turn in unison to actuate the belt 12.

The sub-assemblies 28 and 30 are prevented from moving apart by the springs 98 and the action of the cams, which cause more and more pressure to be applied on the sides of the belt as the torque increases. The dog clutch cam members 32 are mounted for shifting axially in opposite directions on the sleeve 26. Throughout the entire range of movement of the dog clutch cam members 32 and cam members 76 relative to each other they remain interlocked for effectively transmitting torque in either direction of rotation. The springs 98 keep the sub-assemblies 28 and 30 and the belt 12 centered between the opposite ends of the hub 16.

It will be noted that no provision whatsoever is required for periodic lubrication of the relatively moving parts of the sheave.

What is claimed is:
1. In a motion control sheave, the combination comprising a cylindrical hub, interlocking cam members slidably fitted in series relataion over said hub, a pair of said cam members being fixed relative to each other, and another pair of said cam members being disposed between said fixed cam members and being axially shiftable relative to each other, a pair of conical sheave flanges mounted respectively upon said axially shiftable cam members facing each other to provide a V-shaped annular groove therebetween, and means yieldably biasing said flanges axially toward each other, said hub and fixed cam members on one hand and said axially shiftable cam members on the other hand being provided with engaging surfaces respectively of a plastic polymer and an oil impregnated material.

2. The combination defined in claim 1 wherein the hub is clad with a layer of plastic polymer, the fixed cam members are made of plastic polymer and the axially shiftable cam members are made of oil impregnated metal.

3. The combination defined in claim 2 wherein the plastic polymer is nylon, and the metal is bronze.

4. In a motion control sheave, the combination comprising a hub including an inner sleeve adapted for being fitted over and affixed to a shaft, and an outer sleeve made of nylon and fitted over and affixed to said inner sleeve, cam members slidably fitted in series relation over said hub, each adjacent pair of said cam members being provided with axially extending interlocking elements, a pair of said cam members being made of nylon and being fixed relative to each other, another pair of said cam members being made of oil impregnated sintered bronze and being disposed between said fixed cam members and being shiftable relative to each other, a pair of conical sheave flanges mounted respectively upon said axially shiftable cam members facing each other to provide a V-shaped annular groove therebetween, and means yieldably biasing said flanges axially toward each other.

References Cited by the Examiner
UNITED STATES PATENTS

| | | | |
|---|---|---|---|
| 2,283,392 | 5/1942 | Shadrick | 74—230.17 |
| 2,541,766 | 2/1951 | Jereb. | |
| 2,760,378 | 8/1956 | Van Deventer. | |
| 2,952,161 | 9/1960 | Williams | 74—230.17 |
| 3,122,384 | 2/1964 | Luenberger | 74—230.17 X |

DAVID J. WILLIAMOWSKY, *Primary Examiner.*

L. H. GERIN, *Assistant Examiner.*